No. 781,853. PATENTED FEB. 7, 1905.
C. THIBODEAU.
CANDY PULLING MACHINE.
APPLICATION FILED APR. 18, 1904.
2 SHEETS—SHEET 1.
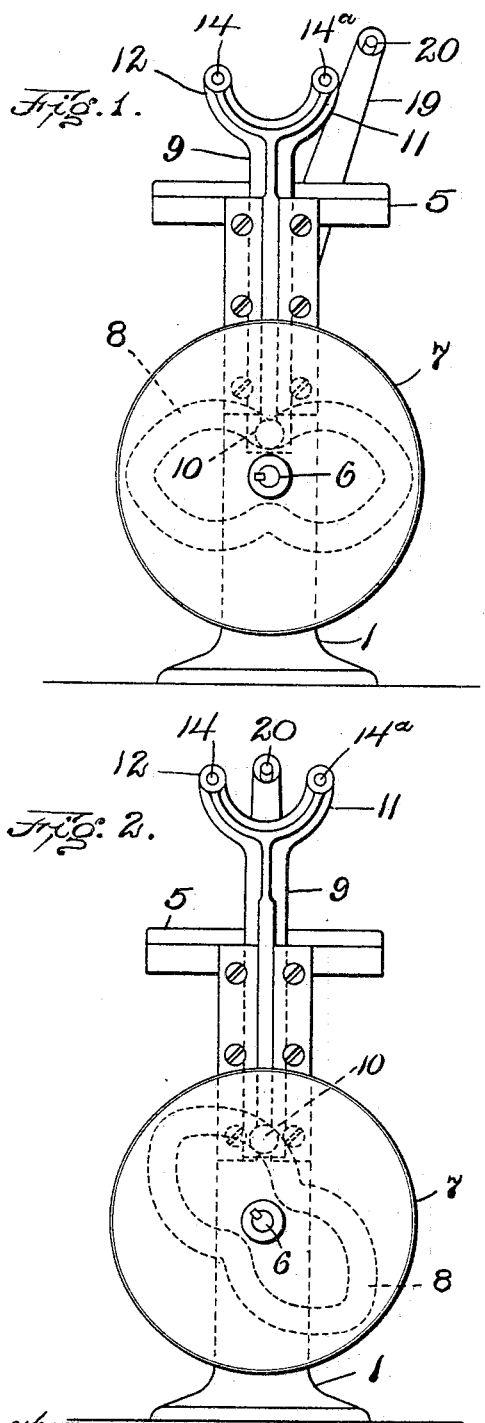
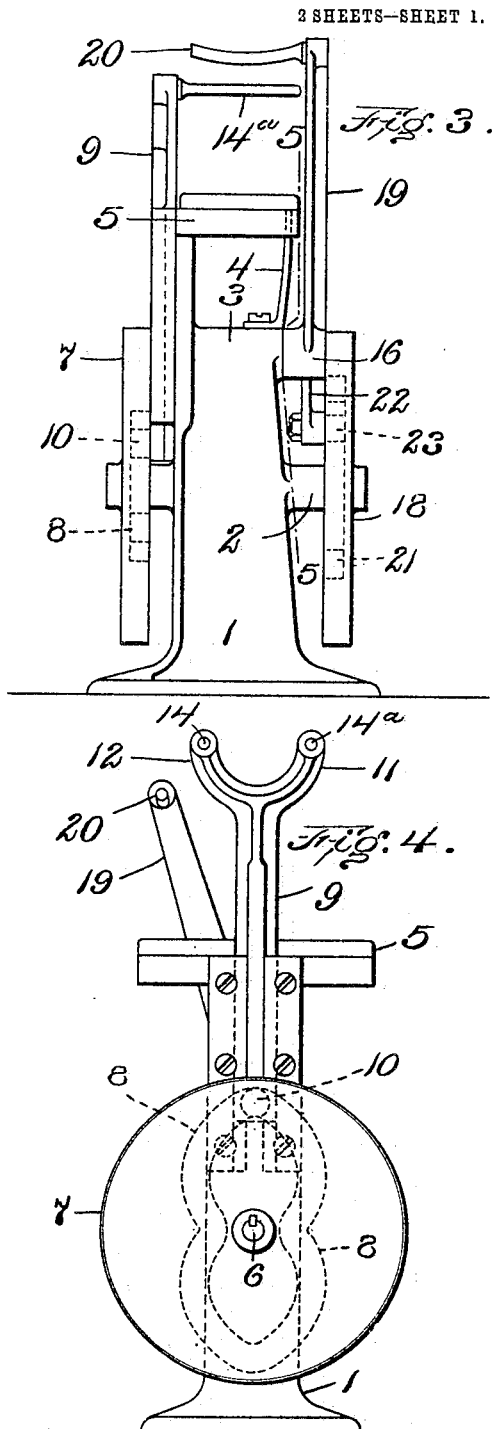

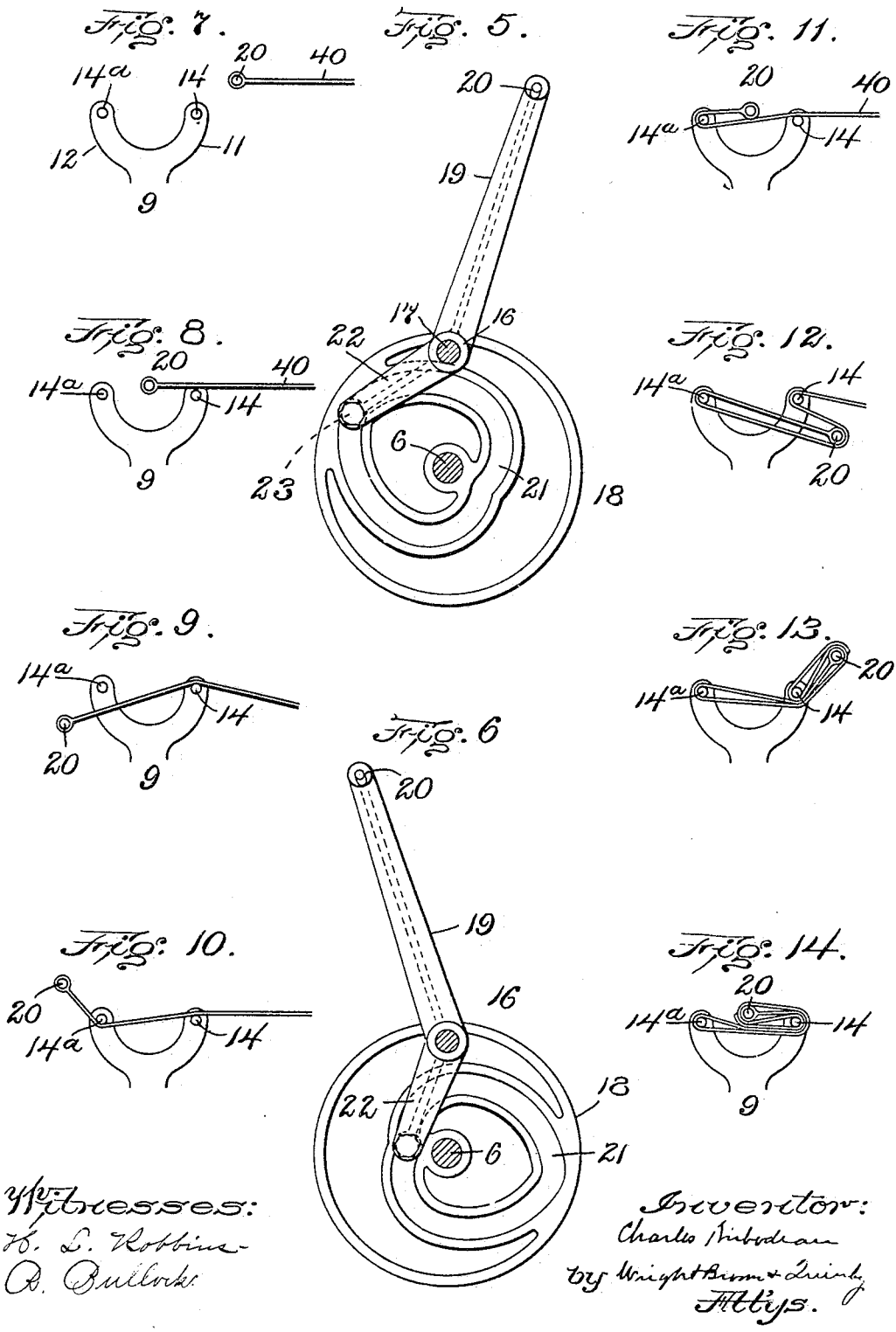

No. 781,853. Patented February 7, 1905.

UNITED STATES PATENT OFFICE.

CHARLES THIBODEAU, OF SOMERVILLE, MASSACHUSETTS, ASSIGNOR TO P. DUFF & SONS, A FIRM, OF PITTSBURG, PENNSYLVANIA.

CANDY-PULLING MACHINE.

SPECIFICATION forming part of Letters Patent No. 781,853, dated February 7, 1905.

Application filed April 18, 1904. Serial No. 203,545.

*To all whom it may concern:*

Be it known that I, CHARLES THIBODEAU, of Somerville, in the county of Middlesex and State of Massachusetts, have invented certain new and useful Improvements in Candy-Pulling Machines, of which the following is a specification.

Figure 1 is a left-hand end elevation representing a machine constructed in accordance with my invention. Fig. 2 is a like view showing a different position of the parts. Fig. 3 is a front elevation. Fig. 4 is a view similar to Fig. 2, showing the parts in different positions. Figs. 1, 2, and 4 show the complete motion of the vibrating hook from right to left. Fig. 5 is a detail view showing in front elevation the cam for the vibrating hook and the connection between the cam and said hook. Fig. 6 is a like view showing the parts in different position. Figs. 7 to 14, both inclusive, are diagrammatic views showing the successive relative positions in relation to each other occupied by the oscillating hook and the rotary hooks.

1 represents a suitable standard formed with a bearing 2 near its base and with a bearing 3 at a suitable distance above the bearing 2.

4 represents an arm secured to the top of the bearing 3 and supporting a table 5.

6 represents a shaft formed in the bearing 2 and adapted to be driven by any suitable source of power and by means of any desired connection, whether by way of the extension of the shaft 6 or otherwise.

7 represents a disk fast on the left-hand end of the bearing 2 and formed upon its inner face with a cam-path 8.

9 represents a slide arranged to move in vertical ways on the left-hand side of the machine. This slide at its lower end is provided with a roll 10, arranged in the cam-path 8. The slide 9 at its upper end is formed with arms 11 12, each of which carries a candy-hook 14 $14^a$. As power is applied to the machine the slide 9 is given two complete reciprocations for each rotation of the shaft 6.

16 represents a hub mounted upon a pintle 17, secured in the bearing 3 at the right-hand end of the machine.

19 represents a vertical arm formed on the hub 16 and provided at its free end with a candy-hook 20, the hooks 20 and 14 $14^a$ projecting toward each other over the table 5. (See Fig. 3).

18 represents a disk secured to the shaft 6 on the right-hand end of the machine. (See Figs. 3, 5, and 6.) This disk upon its inner face is formed with a cam-path 21.

22 represents an arm formed upon the hub 16. Said arm at its free end carries a roller 23, arranged in the cam-path 21. By this arrangement the rotation of the disk 18 causes a vibration of the end of the arm 19 and of the hook 20, one complete vibration being made of the said hook 20 for each rotation of the shaft 6. The parts are so timed, as stated, that while the hook 20 is given one complete vibration two complete reciprocations are given to the hooks 14 $14^a$, the result being that the hook 20 has a path of motion about the hooks 14 $14^a$.

Assuming the parts to be in the position shown in Fig. 7, the candy 40 is placed on the hook 20 and the machine started. The parts are so timed that the hook 20, with the candy 40, passes over the hook 14 just in time for the latter to engage the candy by the time the hook 20 is positioned between the hooks 14 and $14^a$. The continued movement of the machine causes the hook 20 to pass to the left and the hooks 14 $14^a$ to rise, thus causing the hook 20 to pass beneath the hook $14^a$, as shown in Fig. 9. As the machine continues to operate the hooks 14 $14^a$ complete their downward movement, and the hook 20 completes its movement to the left, as shown in Fig. 10, wrapping the candy about the hook $14^a$. The hooks 14 $14^a$ rising and the hook 20 passing to the right, as shown in Fig. 11, passes over the hook $14^a$, between the hooks 14 $14^a$, and below the hook 14, as shown in Fig. 12. When the hook 20 is past the hook 14, the hooks 14 $14^a$ move downward to the position shown in Fig. 13. This brings the parts to substantially the position shown in Fig. 7, a further movement being a repetition of the movement shown in Fig. 8. In this arrangement the hooks 14 $14^a$ are reciprocated twice for each corresponding motion of the hook 20, thus causing the hook 20 to move in and about the hooks 14 and 14ª.

Having thus explained the nature of my invention and described a way of making and using the same, although without attempting to set forth all of the forms in which it may be made or all of the modes of its use, what I claim, and desire to secure by Letters Patent, is—

In a candy-pulling machine, a vibrating puller, a pair of hooks arranged to reciprocate in a right line only and in the plane of the puller, means for operating said parts arranged to give two complete reciprocations to the hooks for each corresponding movement of the puller, whereby the latter is caused to describe a general figure-8 path of motion.

In testimony whereof I have affixed my signature in presence of two witnesses.

CHARLES THIBODEAU.

Witnesses:
R. BULLOCK,
H. L. ROBBINS.